William J. Emen's Improvement in
INDIA RUBBER SPRING BED BOTTOMS.

No. 74675

PATENTED FEB 18 1868

Witnesses,
Aaron Huntsberry
James Bell

Inventor,
William J. Emens

United States Patent Office.

WILLIAM J. EMENS, OF LOUISVILLE, KENTUCKY.

Letters Patent No. 74,675, dated February 18, 1868.

IMPROVED SPRING-BED BOTTOM.

The Schedule referred to in these Letters Patent and making part of the same.

TO ALL WHOM IT MAY CONCERN:

Be it known that I, WILLIAM J. EMENS, of the city of Louisville, county of Jefferson, and State of Kentucky, have invented a new and useful improvement in India-rubber spring-bed bottoms, entitled "William J. Emens's Improvement in India-Rubber Spring-Bed Bottoms;" and I do hereby declare that the following is a full, clear, and exact description of the construction and operation of the same.

Figure 1 is a perspective view of the bedstead, C showing how the slats or bottom is put in the same. A is a small piece of wood, running across the bedstead, at each end of the same, to support the slats or bottom. B is a strip or small piece of wood, running through a mortise in the cross-piece A, on either side of the bedstead, and is movable at either end, so that it can be lengthened or shortened in case the gum rings should stretch and become too long. C is a small strip of wood, running across the bedstead, under the strip B, in order to hold it up when the weight presses down heavily. D is a ring, made of gum-elastic, and is attached to the cross-piece A by a large wood-screw being screwed in the top of said piece A, and said ring being hooked over and caught by the hook E at both ends of the bedstead. Said hook being shaped as in figs. 3 and 4, having a pin or projection on the top of the same which passes through a hole in the slat F, and, fitting the hole close, it supports the hook E in an upright position, and as the pressure comes on the slat F is pressed down in the middle, and hence the gum rings under the hooks stretch and contract, and render the whole bottom elastic, and operate with uniformity and ease to the person occupying the bed, and are not subject to get out of order, as in the case of the old styles.

Figure 1:
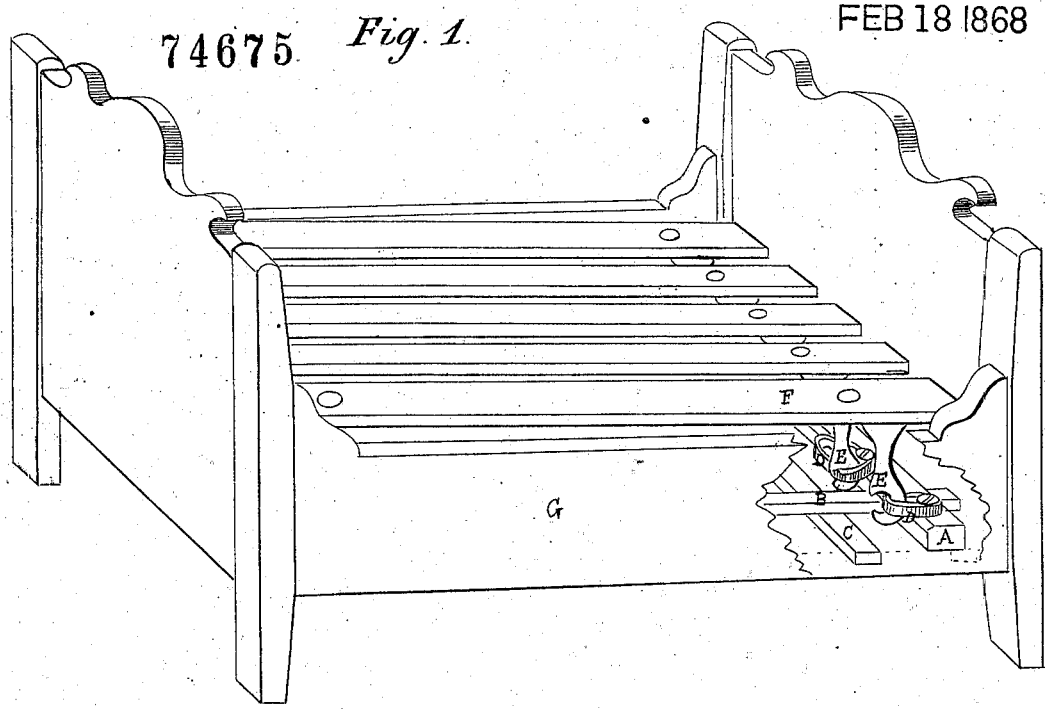
Figure 2:
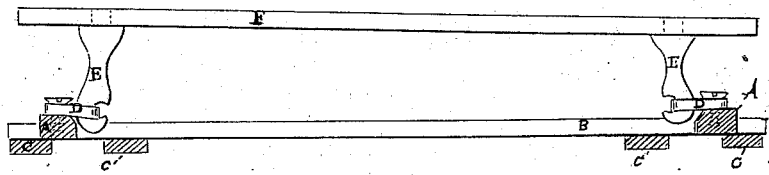
Figure 2 is a side view of one of the slats with the bottom frame, with hooks E showing how the slats are suspended on the rings D by screws in the cross-piece A in order to produce the elastic spring.
Figure 3:
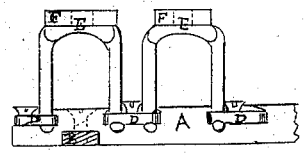
Figure 3 is a view showing the shape of the hooks which rest on the gum rings.
Figure 4:
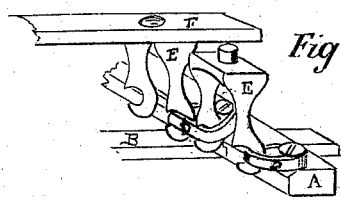
Figure 4 is a perspective view of a part of one of the slats, with its hook, ring, and section of the bottom frame, showing the shape of said hooks, and how they are attached to the rings D and slats F, said hooks being made of cast iron or other metal suitable.

The above bedstead is made in the usual way, except that it has a projection on the inside of the rail C, on which the cross-pieces C and A rest, which supports the bottom frame, on which rest all the slats F, as seen in fig. 1, said bed-bottom being made of wood, as usual, except the hooks and springs, which are made as above stated.

What I claim as my invention, and desire to secure by Letters Patent, is—

The combination of the forked hook E and the slat F, the gum ring D, the movable cross-piece A, and the parallel strips B and C, when constructed, arranged, and operating in the manner set forth.

WILLIAM J. EMENS.

Witnesses:
   JAMES BELL,
   AARON HUNTSBERRY.